United States Patent [19]

Lehmacher

[11] 4,046,257
[45] Sept. 6, 1977

[54] PAD-STACKED BAGS OR SIMILAR PACKAGING, AND APPARATUS AND METHOD FOR FABRICATING THE SAME FROM PLASTIC FILM

[76] Inventor: Hans Lehmacher, Niederkassel-Mondorf, Germany

[21] Appl. No.: 567,073

[22] Filed: Apr. 10, 1975

Related U.S. Application Data

[63] Continuation-in-part of Ser. No. 282,193, Aug. 17, 1972, Pat. No. 3,966,524.

[30] Foreign Application Priority Data

| Apr. 13, 1974 | Germany | 2418233 |
| Sept. 11, 1974 | Germany | 2443448 |
| Nov. 22, 1974 | Germany | 2455322 |
| Aug. 17, 1971 | Germany | 2141045 |
| June 19, 1972 | Germany | 2229728 |
| July 7, 1972 | Germany | 2233408 |
| July 26, 1972 | Germany | 2236523 |

[51] Int. Cl.² .................................... B65D 85/54
[52] U.S. Cl. ........................... 206/544; 93/DIG. 1; 206/554

[58] Field of Search .............. 93/1 G, DIG. 1; 206/449, 451, 494, 498, 526, 801–806, 820, 544; 229/69; 156/288, 290

[56] References Cited

U.S. PATENT DOCUMENTS

| 3,021,947 | 2/1962 | Sylvester et al. | 206/526 |
| 3,312,339 | 4/1967 | Million | 206/526 X |
| 3,317,037 | 5/1967 | Russell | 206/526 |
| 3,352,411 | 11/1967 | Schwarzkopf | 206/526 X |
| 3,361,294 | 1/1968 | Bjerum | 206/526 X |
| 3,509,990 | 5/1970 | Piazze | 206/449 |

*Primary Examiner*—Steven E. Lipman
*Attorney, Agent, or Firm*—P. D. Golrick

[57] ABSTRACT

Thermoplastic film bags or like packaging sections with or without hanger holes are stacked and welded into pads from which individual bags are easily hand-torn for use. Bag sections, each with a hanger portion and having an arched cut in one wall, are produced three at a time from a continuously longitudinally sub-divided and side seam welded, wide flattened film tube stock web, after incising the cuts at three transversely spaced places in one layer; the sections are stacked and at the hanger parts welded into a pad, and the pad is transversely perforated through the incised arched cuts and hanger holes punched in the hanger part.

12 Claims, 6 Drawing Figures

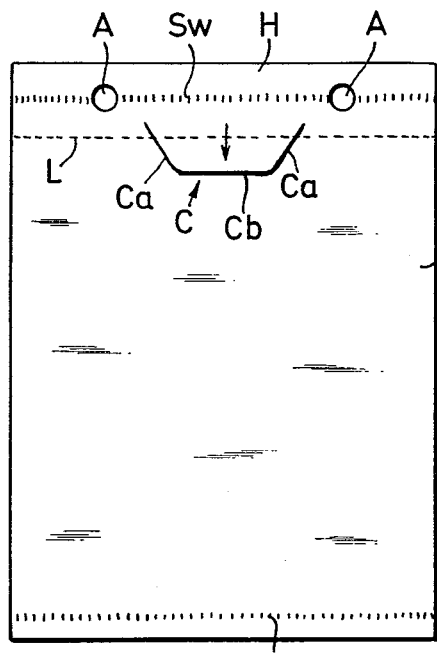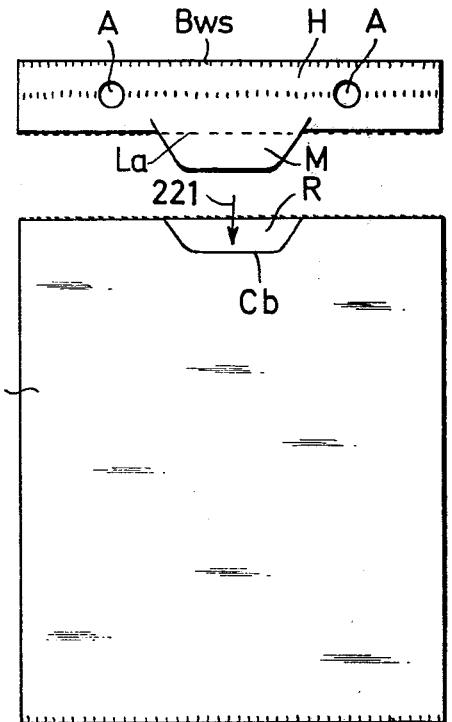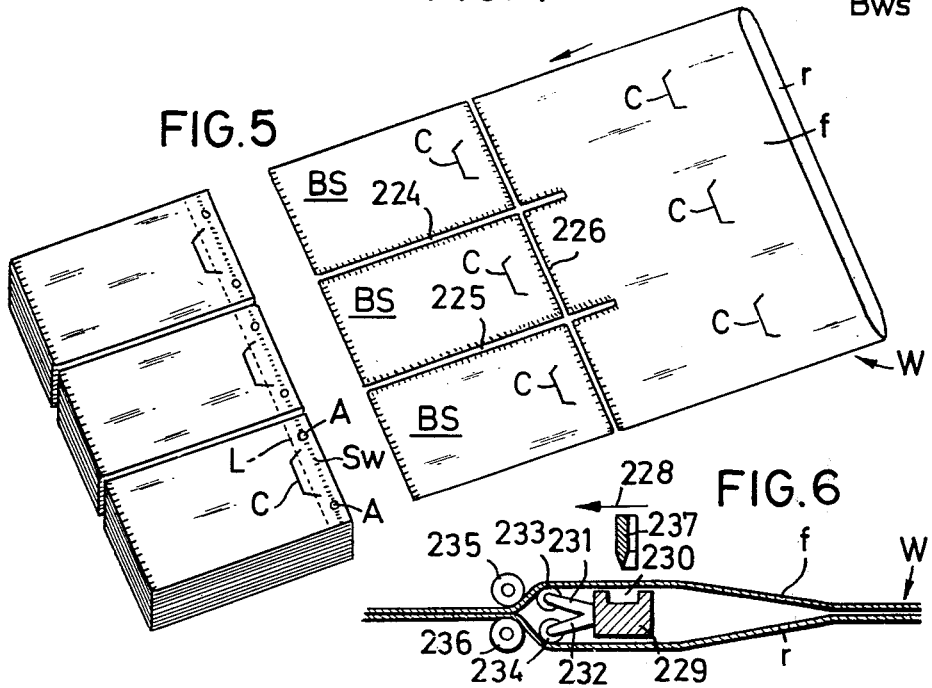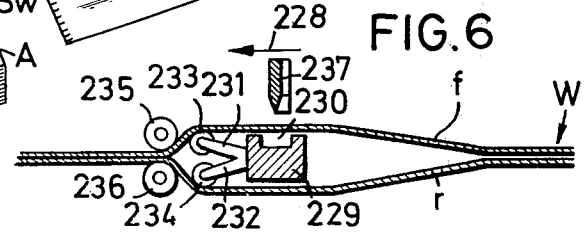

PAD-STACKED BAGS OR SIMILAR PACKAGING, AND APPARATUS AND METHOD FOR FABRICATING THE SAME FROM PLASTIC FILM

This is a continuation-in-part of copending patent application Ser. No. 282,193, filed Aug. 17, 1972, now U.S. Pat. No. 3,966,524, granted June 29, 1976.

Numerous known carrying bag and like packaging structures are produced from a thermoplastic film stock such as flattened thermoplastic film tube, extruded as such, or formed by continuously longitudinally folding over a single layer film web and longitudinally seaming the edges, to produce a flat film tube. For example a web of such tubular stock is transversely severed into bag sections corresponding to a bag length, or a bag length plus a suspension portion, with or without bottom seaming depending upon whether a bottom-seamed bag or bottomless bag is desired; and various other operations may be carried out to give particular bag structure required. Aggregation of such sections, into stacks in some way held together as pads from which bags are removed individually as needed at the point of ultimate use, is also known.

The above mentioned copending application describes several types of plastic bags, and bag sections adapted for stacking and welding into bag pad units, particularly bag sections affording respective suspension portions in which welding is effected for joining the bags into a pad unit. The individual sections jointly form a pad part which may be engaged on pegs or a bracket as suspending or hanging means for the pad from which the bags are individually torn for use. It also discloses various methods for continuously fabricating bags and pads of bags from thermoplastic film in the immediate form of a continuous web of so-called flat tubular film, and apparatus for producing bags and pads of tearoff bags by those methods.

The above-described tear-off bags and pads, and fabricating methods and apparatus have been burdened to some degree with certain disadvantages, for example, relative to pad structure and use or ultimate bag form, or complexity of structure or operation of apparatus for producing the same.

Among objects of the present invention are providing improved forms of bags or bag sections for stacking and welding into pad units, to provide pads from which the bags at time of use are torn easily or without damaging the bag structure, and to provide an improved bag when finally removed.

With respect to tear-off bags and pad structures, the invention advantageously provides a pad aggregation of flat bag sections each integrally comprising a tear-off portion for the bag proper and a suspension portion from which the bag may be torn along a bounding perforation line; the section being joined into a pad by welding over the section width in the suspension portion a line located between hanger engagement holes in the suspension portion and the perforation line, the regions between the weld and perforation lines being free of film discontinuities; the welding location being preferably closely parallel to the perforation line.

With advantage also, one section wall has a central broad inverted arch-shaped, flat bottomed U-shaped, or arcuate incision through the limbs of which the perforation line runs, facilitating manufacture, tear-off and bag opening. Method-wise the product structure is produced by making the incisions in the web from which sections are to be severed, with the perforation line subsequently made in the sections individually, or after aggregation into a pad, preferably with the perforation line and incision bottom spaced closely parallel.

Other objects and advantages will appear from the following detailed description and the drawings wherein:

FIG. 3 is a front elevational view of another tear-off bag web section;

FIG. 4, similar to FIG. 3, shows a torn-off bag and the respective hanger part;

FIG. 5 by a perspective schematic view of a web represents a method for production of pads of a FIG. 3 type tear-off bags;

FIG. 6 is a fragmentary vertical longitudinal section through a film tube and an incising device as a part of apparatus for effecting the method of FIG. 5.

GENERAL

In accordance with the present invention, from a continuous web of flat thermoplastic film tube, various bags exemplified and designated B in FIGS. 1-4 are produced and stack-welded into pads P, from which individual bags may be easily torn by hand for use.

The term "stack-welding" as herein used, means thermoplastically bonding or welding a severed web section—as it is added to a stack being built up—to the preceding section in the stack, each section either being, or corresponding to, a respective finished bag; verb, noun and participles being used with analogous meanings.

"Horizontal stacking" as herein used means horizontally shifting successive, severed vertically disposed flat web sections, in a direction perpendicular to the section plane against a preceding section on a growing vertically oriented stack. However, various aspects of the invention, particularly pertaining to apparatus, may be applied for vertical or oblique stacking.

Unless context dictated otherwise, "flattened film tube", as naming a web from which bags are to be produced, includes not only extruded film tubing flattened to a two-layer web, but also similar two-layer webs produced by longitudinally folding over a continuous strip and weld seaming the free edges, or by longitudinally weld-severing a larger flattened tube into two or more smaller flattened tubes, or webs.

In general, the same or similar reference legends will be applied to identical or analogous parts among modifications.

Figure 1:
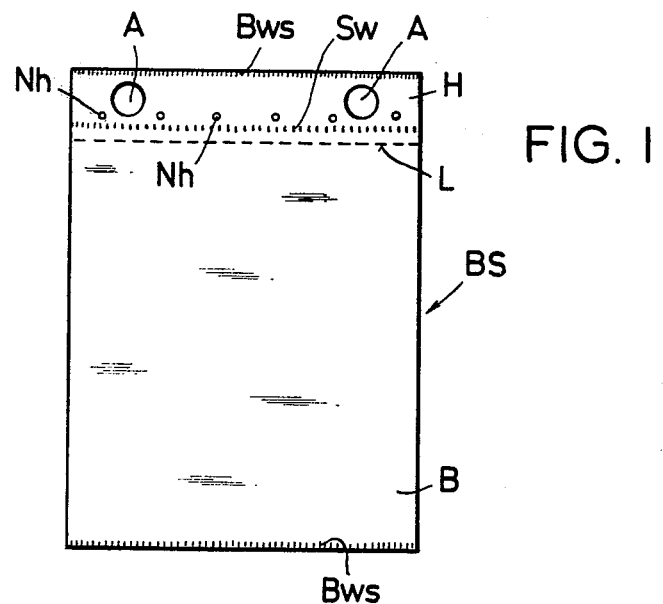
FIG. 1 is a front elevational view of an individual web section comprising a tear-off bag and hanger part or in effect a front elevation of the pad of FIG. 2.
Figure 2:
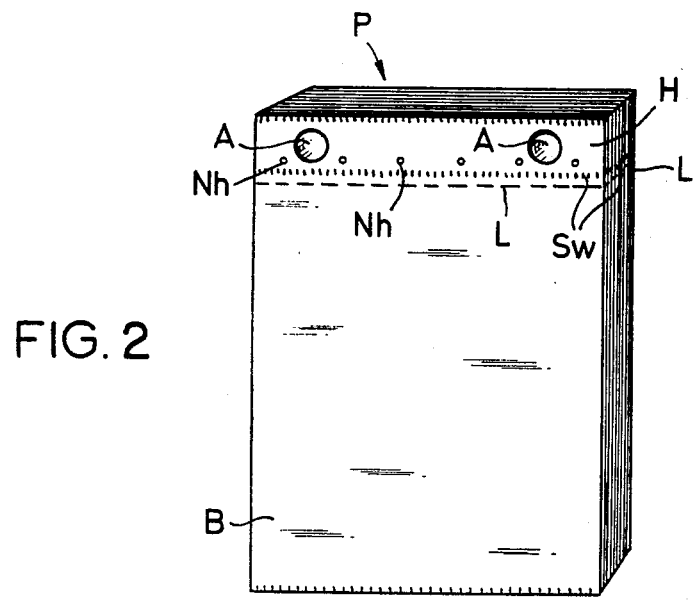
FIG. 2 is a generally front perspective view, of a bag pad corresponding to FIG. 1.

Bags of FIGS. 1 and 2

FIG. 1 shows an individual web section BS as comprised of a respective bag portion B and a suspension portion H yet integrally joined at a transverse tear-off perforation line L extending across the entire web section width, with the perforations piercing both layers. When the bag is separated from H, the bag mouth is formed at the tear-off line L.

The very bottom edge of the section has the seam $B_{ws}$, a result of separating the section from a web end by a transverse severing weld, which thermally cuts the section from the web end and also effects a thermoplastic seaming or welding of the two layers along the parted edges of the sections. Hence here there is a seam Bws on the edge of the suspension part H of the separated leading section and at Bws as a bottom seam weld on the bag bottom in the following section.

The bottom seam weld Bws may be omitted to leave the bag bottom open and provide a "bottomless" bag.

In FIG. 1, which also is an effective front elevational view of the pad P in FIG. 2, just beneath a pair of symmetrically outwardly located suspension apertures or holes A, there appears a transverse series of perforations Nh representing in exaggeration residual closed-up punctures where the section had been pierced in fabrication by machine stacking pin elements. The stack welding line Sw in the suspension part runs across the entire section width at a location between apertures A and the perforation line L. The stack-weld of course appears on this and any other section configuration only after the section has been incorporated in a pad. This stack-welding, securing each section to the adjacent section to form the pad of FIG. 2, is spaced closely parallel to the perforation line L. It is strong enough to enable each separate bag B to be manually torn off along the perforations from the pad, the latter being suspended for example on fixed pegs through apertures A; leaving the suspension or hanger parts H still bonded together and retained on the pegs. The close parallel spacing allows clean bag separation simply by exerting a manual pull on the bag, since there is little material to be stretched in, hence no substantial stretching in, the region between these lines, so that tearing tension force is more evenly distributed than it is when suspension apertures or stacking pin holes occur between these lines.

Bags of FIGS. 3–4

In FIGS. 3–4 the web section BS, used for pad forming is generally similar to FIG. 1 as comprising a top suspension portion H and bag portion proper B, relatively defined by the perforation line L; though in FIG. 3, in contrast with FIGS. 1, 2 and 4 the top and bottom present cut edges, with a simple welded seam Bw closing the bottom slightly above the cut bottom edge. The stack weld line Sw is displaced upwardly from the perforation line to pass through the hanging apertures A.

The central downwardly bowed or convex cut C, of an inverted arch shape, a flat bottomed U-shaped incision in the front film layer or panel f, and crossed by the perforation line L, confers a notable difference in the forms of the bag, the web section BS and hence in the resulting pad. This cut C lies principally in what becomes the top or mouth margin of a bag torn from a pad, as clearly appears in FIG. 4 showing the suspension strip H and the separated bag B, derived from a web section similar to FIG. 5, except for section layer edge-joining by welds Bsw as in FIG. 1 in consequence of a severing weld separations from the web. FIG. 10 clearly shows that after the bag is torn from the respective suspension part H, a central notch or recess R appears at the front margin of the bag mouth and corresponding to the flap M remaining on the hanger part.

The legs Ca of cut C diverge upwardly from the bottom Cb, across the perforation line L into the part H. The cut bottom Cb, being thus spaced below and parallel to the perforation line crossing the cut legs, has certain important advantages.

By a finger or thumb, or finger nail moved with light pressure downward, in the direction of the arrow in FIG. 3, the cut bottom edge Cb of an exposed bag can be caught and the front layer or wall of the bag easily lifted away from the back wall or layer r, facilitating tearing a bag from a pad. The recess R in the torn-off bag facilitates opening the bag in like fashion, as a finger is moved into the recess to encounter and lift the cut edge Cb. The tearing off is also easier, since no separation work has to be done at the perforation line portions La, between the cut sides Ca—Ca, for the parts H and B have already been severed at this region by the cut C.

Further in contrast to using a simple straight cut interrupting the central part of the perforation line in the top layer, with the cut C fabrication is simplified. For the perforation line does not have to be made in the web with millimeter-precise location aligned relative to a straight cut already made in the web as in usual procedures. For example as discussed relative to FIG. 5, inasmuch as the perforation line crosses the legs Ca—Ca, it may vary somewhat upwardly or downwardly from designintended placement without impeding or detracting from intended functions. This obviously facilitates manufacture, and especially so where the perforation line L is to be produced after bag sections have been connected into a pad.

When the bag material is thin film, advantageously the severing welding is used, i.e., producing the structures as in FIG. 1 or 4 through a heated wedge jaw; but for thick film, a severing cut is made with a distinct simple seam welding on one side or on both sides where desirable.

It should be noted that certain of the above bag and pad structures may be used also for side gusseted bags, and in association with certain bag structures of the copending application.

Method of FIG. 5 and FIG. 6

FIG. 5 shows a method of making tear-off bags by producing bag sections BS three at a time, simultaneously building three pad stacks the bags of FIGS. 3–4, being shown by way of example.

A single advancing continuous broad flattened tubular web W is in effect continuously converted into three narrower sub-webs; and repeatedly from the web leading ends, three sections are simultaneously separated by a transverse severance.

However, on a first or "upstream" station along the web, simultaneously the three incisions C are made abreast in the top film layer f by a cutting device such as that of FIG. 6. These incisions are appropriately spaced across the web to fall at respective centers of the three equal-width "sub-webs" to be subsequently produced.

At a second station "downstream" from the first, the web is longitudinally severed, along lines 224–225, midway between adjacent incisions, and edge-welded along each severance line by known appropriate tooling; then at a further station the leading ends of the three "sub-webs" are simultaneously transversely severed along the line 226 into three respective bag sections.

Preferably subsequently, a tear-off perforation line L, through both film layers and running into the incisions, is made transversely across the wider web, or the sub-webs. Or the perforating may be done in pads resulting from stacking and joining the sections at the suspension portions, either after the stack is made or by stack welding, over the entire width. Hanger hole perforations A may be made in the same or by a separate operation.

An inverted arched-shaped incision form is preferred; arcuate or, better, of inverted flat-bottomed, broad U-shaped as shown. For these the spacing of the severing line 226 behind the incisions C principally determines in the sections the height size of the suspension portion H, though the occurrence through C of a preferably subsequently made perforation line is precisely determinative of this dimension.

The inverted arch incision, resulting in the FIGS. 3-4 tear-off line form, is preferred to a straight incision, which requires to be aligned with the perforation line; for the perforation line needs merely intersect the side limbs, i.e., the divergent side legs Ca—Ca, of the incision of FIGS. 3-4. This is easily accomplished with a perforation line running entirely across the incision, with no register problems as would be the case with a straight cut, while yet affording an adequate spacing to produce, below the perforation line, the recess R in each section of FIGS. 3-4, useful for ease of bag tear-off and subsequent opening. Small variations in the relative placement of the perforation line are not objectionable, and in this sense then the spacing of the severance from the incision C is essentially determinative of the suspension portion height dimension.

Though the transverse web severance may be made by a severing seam welding, alternatively the section severance may be done by a severance cut, and then making a transverse seam weld to one side of the cut for the bag bottom or even to both sides.

What is claimed is:

1. A pad of tear-off bags or like packaging of thermoplastic synthetic plastic film and constituted of a stack of bag sections comprised of said film, said sections each corresponding to a respective bag, each bag section comprising a front wall and a back wall coextensive with the front wall, each section including a tear-off portion and a transverse suspension portion, the suspension portion having hanger holes, the portions of each section being separable along a line of perforations through both said walls, the said sections being connected at the suspension portions thereby to form the pad with a pad suspension portion, with the improvement comprising:
    a continuous padding welding seam extending in over substantially the entire width of each suspension portion whereby the sections are connected into a pad unit.
2. A pad as described in claim 1, wherein
    the suspension portion region between the padding weld seam and the perforation line is free of film discontinuities.
3. A pad as described in claim 1, wherein
    each bag section is closed at its bottom by a severing welding type weld.
4. A pad as described in claim 1, wherein
    the padding welding seams are located in the space between the perforation line and the hanger holes of each said section.
5. A pad as described in claim 1, wherein
    said padding welding seams are located along the free edge of each respective suspension portion.
6. A pad as described in claim 1, wherein
    said padding welding seams are located between the hanger holes and the free edge of each respective suspension portion.
7. A pad as described in claim 1, wherein
    each said suspension portion has a line of spaced pin punctures running across the width thereof.
8. A pad as described in claim 1, with the further improvement comprising:
    in each bag section a front wall having a central incision dividing the central part of the tear-off bag portion from the respective suspension portion,
    said incision having a flat bottomed U-shape, and the perforation line extending over the entire width of the bag section and crossing through both limbs of the U-shaped incision, the bottom edge of the incision being spaced parallel to the perforation line;
    whereby a bag torn from the suspension portion has, in one bag wall edge at its mouth, a recess corresponding to the contour of the U-shaped incision beneath the perforation line and a projecting flap corresponding to the recess remains on the suspension portion.
9. A pad of tear-off bags constituted of a stack of thermoplastic synthetic film bag sections each corresponding to a respective bag,
    each bag section comprising a front wall and a back wall coextensive with the front wall and having an upper suspension portion and a tear-off bag portion separable therrefrom along a line of perforations,
    the said sections being connected at the suspension portions thereby to form the pad with a pad suspension portion, the pad suspension portion being provided with at least one hanger aperture,
with the improvement comprising:
    in each bag section a front wall having a central incision dividing the central part of the tear-off bag portion from the respective suspension portion, and
    the line of perforations through both said walls running into the incision from each side of the section;
    the sections being connected to one another by a padding weld in the suspension portions, and
    each being closed across its bottom to afford a closed bag bottom.
10. A pad as described in claim 9, wherein
    the incision has an inverted arch shape, and
    the perforation line intersects both side limbs of the said incision.
11. A pad as described in claim 10, wherein
    a bottom edge of the U-shaped incision is spaced parallel to the perforation line,
    whereby a bag torn from the suspension portion has, at its mouth a recess on one bag wall edge, corresponding to the contour of the arch shaped incision beneath the perforation line and a projecting flap corresponding to the recess remains on the suspension portion,
12. A pad as described in claim 9, wherein
    the said incision has a flat bottomed U-shape, and
    the perforation line extends over the entire width of the bag sections and crosses through both limbs of the U-shaped incision.

* * * * *